(12) United States Patent
Onishi (10) Patent No.: US 11,025,529 B2
(45) Date of Patent: Jun. 1, 2021

(54) RADIO COMMUNICATION SYSTEM AND RADIO COMMUNICATION METHOD

(71) Applicant: TOYOTA JIDOSHA KABUSHIKI KAISHA, Toyota (JP)

(72) Inventor: Ryokichi Onishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 16/299,235

(22) Filed: Mar. 12, 2019

(65) Prior Publication Data

US 2019/0306050 A1    Oct. 3, 2019

(30) Foreign Application Priority Data

Mar. 30, 2018    (JP) .............................. JP2018-067933

(51) Int. Cl.
| | |
|---|---|
| *H04W 4/00* | (2018.01) |
| *H04L 12/733* | (2013.01) |
| *H04L 29/08* | (2006.01) |
| *H04W 40/24* | (2009.01) |
| *H04W 4/38* | (2018.01) |
| *H04W 40/02* | (2009.01) |
| *G06F 16/22* | (2019.01) |

(52) U.S. Cl.
CPC .......... *H04L 45/20* (2013.01); *G06F 16/2255* (2019.01); *H04L 67/12* (2013.01); *H04W 4/38* (2018.02); *H04W 40/023* (2013.01); *H04W 40/24* (2013.01)

(58) Field of Classification Search
CPC ......... H04W 28/08; H04W 4/44; H04W 4/40; H04W 4/46; H04W 84/20; H04W 4/38; H04W 8/08
See application file for complete search history.

(56) References Cited

U.S. PATENT DOCUMENTS

2010/0145570 A1    6/2010    Asahara et al.
2017/0215064 A1    7/2017    Onishi et al.

FOREIGN PATENT DOCUMENTS

| JP | 2010-140072 A | 6/2010 |
|---|---|---|
| JP | 2016-025463 A | 2/2016 |
| WO | 2012/111255 A1 | 8/2012 |

*Primary Examiner* — Abdelillah Elmejjarmi
(74) *Attorney, Agent, or Firm* — Oliff PLC (57) ABSTRACT

A radio communication system in which a master node collects data acquired by a plurality of sensor nodes. The master node transmits, to the plurality of sensor nodes, a data transmission request including held data information that is information related to data already held by the master node. The sensor node transmits, to the master node, data not held by the master node on the basis of the held data information, and transfers the data transmission request to another sensor node.

6 Claims, 8 Drawing Sheets

RADIO COMMUNICATION SYSTEM AND RADIO COMMUNICATION METHOD

CROSS REFERENCE TO THE RELATED APPLICATION

This application claims the benefit of Japanese Patent Application No. 2018-067933, filed on Mar. 30, 2018, which is hereby incorporated by reference herein in its entirety.

BACKGROUND

Technical Field

The present disclosure relates to a radio communication system.

Description of the Related Art

In recent years, researches have been conducted to collect and utilize data from traveling vehicles. For example, collecting the current position and speed information from a plurality of vehicles makes it possible to generate congestion information in real time. Besides this, analyzing data collected from the vehicles from various fields makes it possible to achieve smooth traffic.

As a technique related to this, for example, there is a system described in Japanese Patent Application Publication No. 2010-140072. In this system, when a vehicle that needs information specifies an area and transmits a request, the request is broadcast to a plurality of other vehicles and then a vehicle located in the specified area transmits sensed data to the request source. This makes it possible to effectively utilize the data sensed in the specified area.

SUMMARY

On the other hand, there is a problem of data duplication in collecting data sensed by a plurality of vehicles. For example, when the plurality of vehicles perform sensing, an excessive amount of information is transmitted in an area where the vehicles are densely packed, which puts more load than necessary on the network or servers.

Accordingly, in a form in which information is aggregated from a plurality of nodes, it is desirable to transmit data desired by a data request source (for example, a center server) with a minimum amount of traffic. However, it is difficult for the conventional techniques to do so.

The present disclosure has been made in view of the above problem, and it is an object of the present disclosure to reduce the load in a system for collecting data from a plurality of nodes.

The present disclosure in its one aspect provides a radio communication system in which a master node collects data acquired by a plurality of sensor nodes, wherein the master node comprises an information requester configured to transmit, to the plurality of sensor nodes, a data transmission request including held data information that is information related to data already held by the master node, and the sensor node comprises a transmitter configured to transmit, to the master node, data not held by the master node on the basis of the held data information, and a transferer configured to transfer the data transmission request to another sensor node.

As long as the held data information is information related to data held by the master node, the held data information may be information for identifying the data held by the master node, or information for identifying data not held by the master node. Also, the held data information does not have to represent these pieces of data directly. For example, the held data information may indicate a hash value, a probabilistic data structure, or the like. By referring to the held data information transmitted from the master node, the sensor node can determine whether or not the data acquired by the sensor node is to be transmitted to the master node. In addition, the sensor node transfers the received data transmission request to another sensor node, and the other sensor node performs the same determination.

With this configuration, the plurality of sensor nodes can share a criterion for determining whether the data is to be transmitted to the master node. That is, unnecessary transmission of data can be prevented.

Further, when the transmitter has transmitted the data to the master node, the transferer may reflect the transmitted data in the held data information and then transfer the resulting held data information.

When the sensor node has transmitted data to the master node, the other sensor nodes cannot grasp that the data has been transmitted to the master node until the master node again transmits the data transmission request. Therefore, when a certain sensor node has transmitted data to the master node, the data is reflected in the held data information (that is, the held data information is updated so that it can be determined that the data has been transmitted to the master node), and then the data transmission request is transferred to another sensor node.

With this configuration, the other sensor node can recognize that there is data transmitted to the master node by the certain sensor node, and thus unnecessary transmission of data can be prevented more effectively.

Further, the data transmission request may include information representing a hop count from the master node, and the transferer may transfer the data transmission request after incrementing the hop count.

Furthermore, the transferer may not transfer the data transmission request when the received data transmission request is the same as the data transmission request received in the past and the hop count included in the data transmission request is greater than the hop count included in the data transmission request received in the past.

With this configuration, when a plurality of paths are established between the master node and the sensor node, it is possible to stop the transfer of the data transmission request transmitted via the detour path. That is, unnecessary communication can be reduced.

Further, the held data information may indicate a Bloom filter for verifying that the target data is data not held by the master node.

Furthermore, the transferer may add, to the Bloom filter, an identifier of the data transmitted to the master node.

The Bloom filter is a probabilistic data structure used to verify whether an element is a member of a set. Since the Bloom filter has a feature that there is no erroneous detection due to false negatives, the Bloom filter can be used as a data structure for accurately verifying that "there is no specific data in a certain data set". That is, the Bloom filter can be suitably used as the held data information in the present disclosure.

Further, the master node and the sensor node each may transfer the data by segment routing, and the held data information may be transmitted while stored in a segment routing header.

By transmitting the held data information stored in a space for storing information for the segment routing (segment routing header), the held data information can be efficiently shared among the plurality of sensor nodes.

It is noted that the present invention can be identified as a radio communication system or a sensor node including at least a part of the above units. Further, the present invention can be identified as a radio communication method performed by the radio communication system or the sensor node. The above processing and units can be freely combined and implemented as long as technical contradiction does not occur.

According to the present disclosure, in a system for collecting data from a plurality of nodes, the load can be reduced.

DESCRIPTION OF THE EMBODIMENTS (Overview of System)

A preferred embodiment of the present disclosure will be described below with reference to the drawings.

The present disclosure can be applied to a system in which information transmitted from a plurality of sensor nodes (vehicles in the present embodiment) is transmitted to (collected by) a master node.

Figure 1:
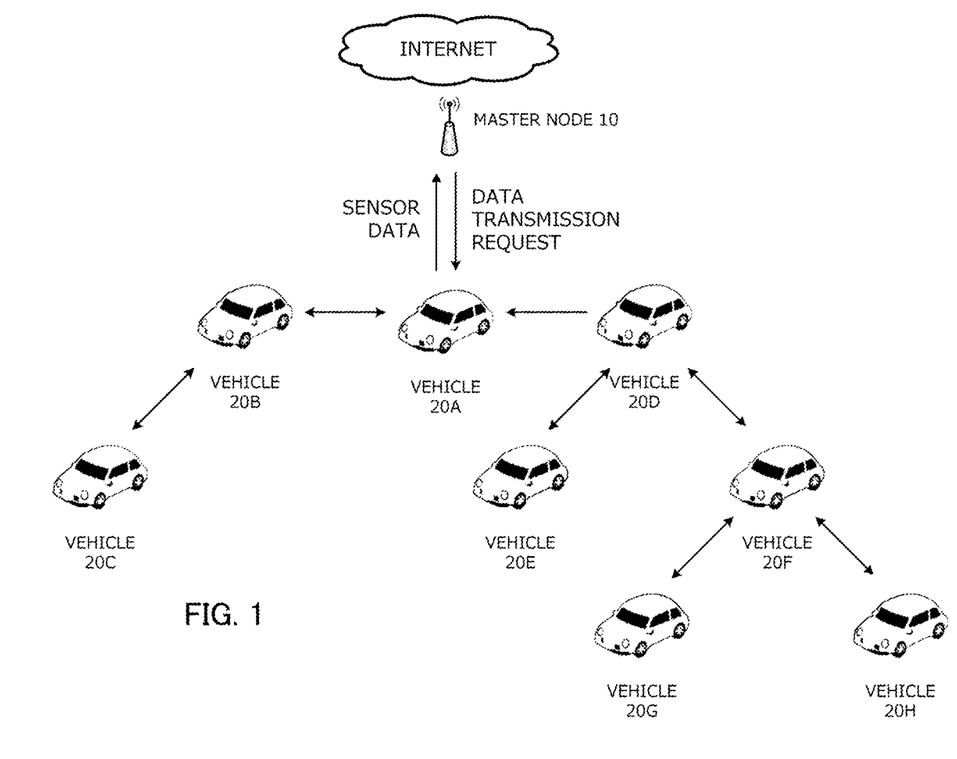
FIG. 1 is a schematic diagram illustrating an information transmission route in an embodiment.

A radio communication system according to the present embodiment is a system for transmitting information generated by a vehicle to the master node by mutual communication between a plurality of radio communication devices mounted on vehicles. FIG. 1 is a schematic diagram illustrating an information transmission route. The radio communication system according to the present embodiment includes a master node 10 and radio communication devices 100 mounted on a plurality of vehicles 20A to 20H (hereinafter collectively referred to as vehicle 20). The radio communication device 100 is mounted on the vehicle 20 and is a device that performs radio communication with the master node 10 and another radio communication device 100. Further, the master node 10 is a communication node connected to a wide area network such as the Internet. The master node 10 is a fixed communication device in the present embodiment, but may be a movable communication device.

In the radio communication system according to the present embodiment, the radio communication device 100 mounted on the vehicle 20 collects sensor data by using a sensor mounted on the vehicle 20.

Specifically, the master node 10 transmits a packet for requesting transmission of data to the radio communication device 100 mounted on the vehicle 20, and the radio communication devices 100 communicate with each other to propagate the packet. Further, when each of the radio communication devices 100 holds information (sensor data) that matches the request transmitted from the master node 10, the radio communication device 100 relays this information to be transmitted to the master node 10.

In the present embodiment, the request transmitted by the master node 10 is referred to as "data transmission request", and the information transmitted by the radio communication device 100 is referred to as "sensor data". In other words, the data transmission request is information for requesting the sensor data to the plurality of radio communication devices 100.

When the sensor data is collected by relaying information between the radio communication devices 100 mounted on the vehicles 20, duplication of information becomes a problem. For example, consider a case where the master node 10 collects the sensor data generated in a certain road section. If the sensor data generated in the road section is unconditionally collected, the same data is transmitted to the master node 10 as the traffic volume increases, so that network resources may be wastefully consumed. In addition, since duplicated data is processed, the machine resources of the master node 10 may be wastefully consumed.

Therefore, in the radio communication system according to the present embodiment, the master node 10 generates information (held data information) related to the data held by the master node 10 and transmits the data transmission request including the held data information to the network constituted by the plurality of radio communication devices 100. As a result, it is possible for the plurality of radio communication devices 100 constituting the network to operate, for example, transmit only the sensor data required by the master node 10.

(System Configuration)

Figure 2:
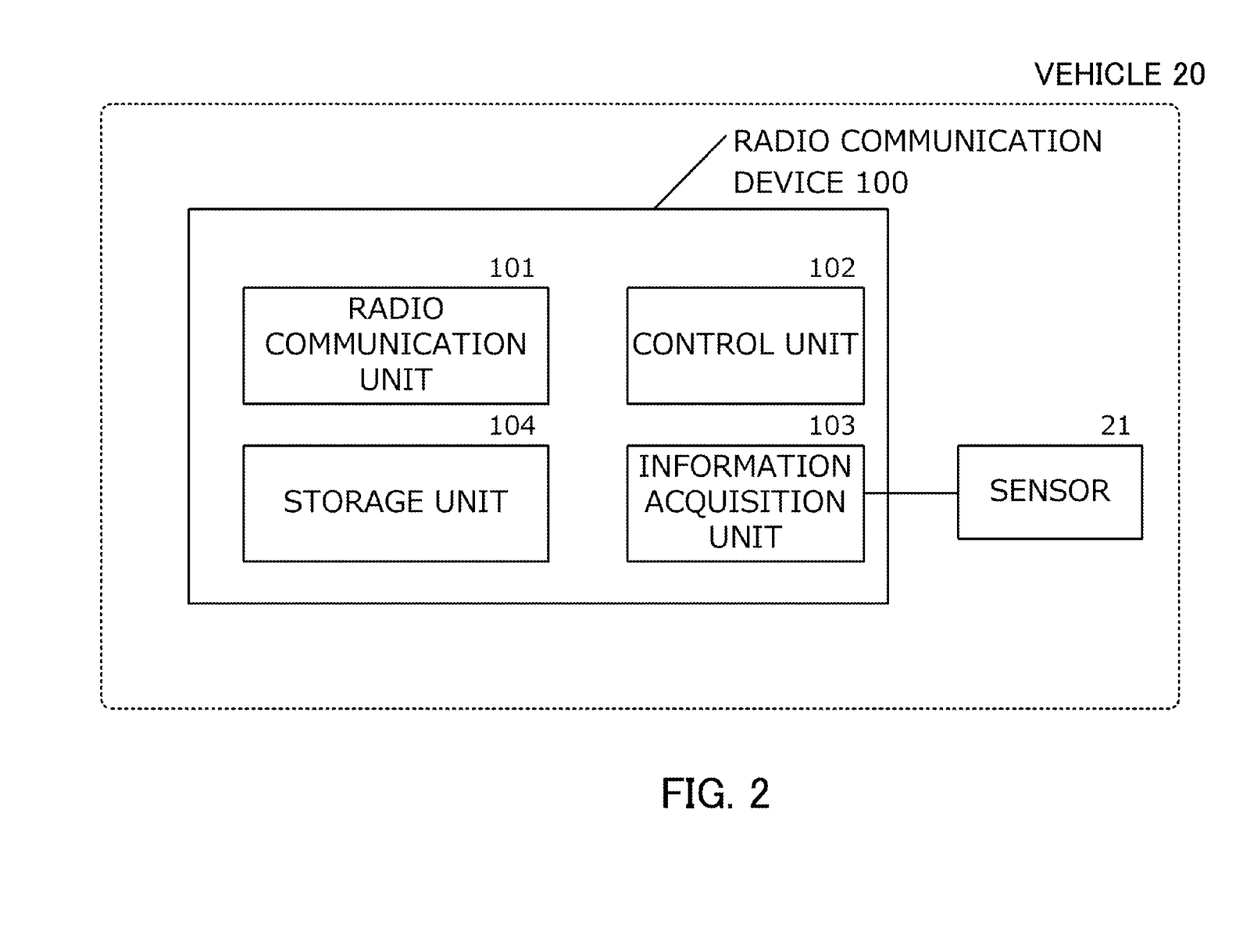
FIG. 2 is a configuration diagram of a radio communication device 100 according to the embodiment.

A configuration of the radio communication device 100 according to the present embodiment will be described with reference to FIG. 2.

The radio communication device 100 is a communication device mounted on the vehicle 20, and includes a radio communication unit 101, a control unit 102, an information acquisition unit 103, and a storage unit 104.

The radio communication device 100 can be configured as an information processing device that includes a central processing unit (CPU), a main storage device, and an auxiliary storage device. A program stored in the auxiliary storage device is loaded into the main storage device and executed by the CPU, so that each unit illustrated in FIG. 2 functions. It is noted that all or a part of the illustrated functions may be executed using a dedicated circuit.

The radio communication unit 101 includes a radio communication interface and is means for transmitting and receiving information via the interface. In the present embodiment, the radio communication unit 101 performs segment routing compliant with SRv6. The segment routing is a routing scheme that carries out traffic control according to segment IDs included in packets, and is a routing scheme aimed to achieve simple and flexible control by expressing a network as segments. As such a segment routing, the segment routing expressing the segments by using the IPv6 extension header is referred to as SRv6.

Figure 3:
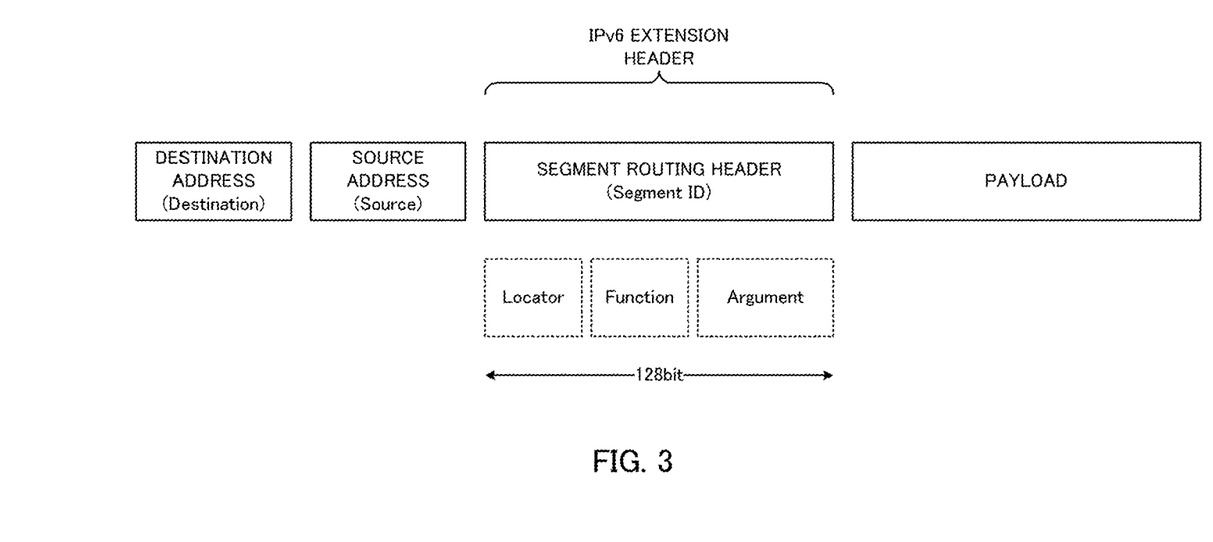
FIG. 3 is a schematic diagram of a routing header transmitted in the embodiment.

FIG. 3 is a diagram illustrating a data format of a packet transmitted by SRv6 (a part of the basic header is omitted). As illustrated in FIG. 3, the packet is configured to have Destination address, Source address, and a segment routing header (Segment ID). The segment routing header is a space in which information related to a request for routing is stored, and can store information such as Locator, Function, Argument, and the like. Locator is, for example, a field in which the identifier of a node executing the request is stored. Further, in Function, an identifier of the request (for example, the identifier of a function to be executed by a node performing routing) is stored. Further, Argument can store data used by the node when executing the request. The arrangement of these pieces of information can be freely designed within the size (128 bits) of the segment routing header. For example, it is possible to define different Function and Argument depending on each node, or to define Function and Argument that are shared among a plurality of nodes. Detailed usage will be described later.

The control unit 102 is means for controlling the transfer of information using the radio communication unit 101. Specifically, the control unit 102 performs establishment of a link with surrounding radio communication devices 100, transfer of the sensor data transmitted from another radio communication device 100, transfer of the data transmission request transmitted from the master node 10, transmission of the sensor data generated by the device itself, and the like. Details of the specific processing will be described later with reference to flowcharts.

The information acquisition unit 103 is means for acquiring the sensor data from a sensor 21 of the vehicle 20. For example, the information acquisition unit 103 periodically generates the sensor data during traveling of the vehicle 20, and temporarily stores the generated sensor data in the storage unit 104 described later. The sensor 21 may be a sensor that acquires a physical quantity of the traveling of the vehicle, or may be a sensor that collects information (for example, an in-vehicle camera or the like). Further, the sensor 21 may be a group of multiple sensors.

The information acquisition unit 103 can acquire, as the sensor data, for example, a vehicle speed, position information, acceleration, the number and positions of other vehicles existing in the vicinity of the vehicle, the number and positions of obstacles (for example, pedestrians, bicycles, other obstacles, and the like) existing in the vicinity of the vehicle, an image acquired by the in-vehicle camera, information acquired based on the image, and the like. It is noted that the information acquisition unit 103 may perform processing for generating or processing these pieces of information. For example, new data may be generated by analyzing or converting data acquired from the sensor 21. The sensor data acquired by the information acquisition unit 103 is temporarily stored and transmitted to the master node 10 by processing described later.

Figure 4:
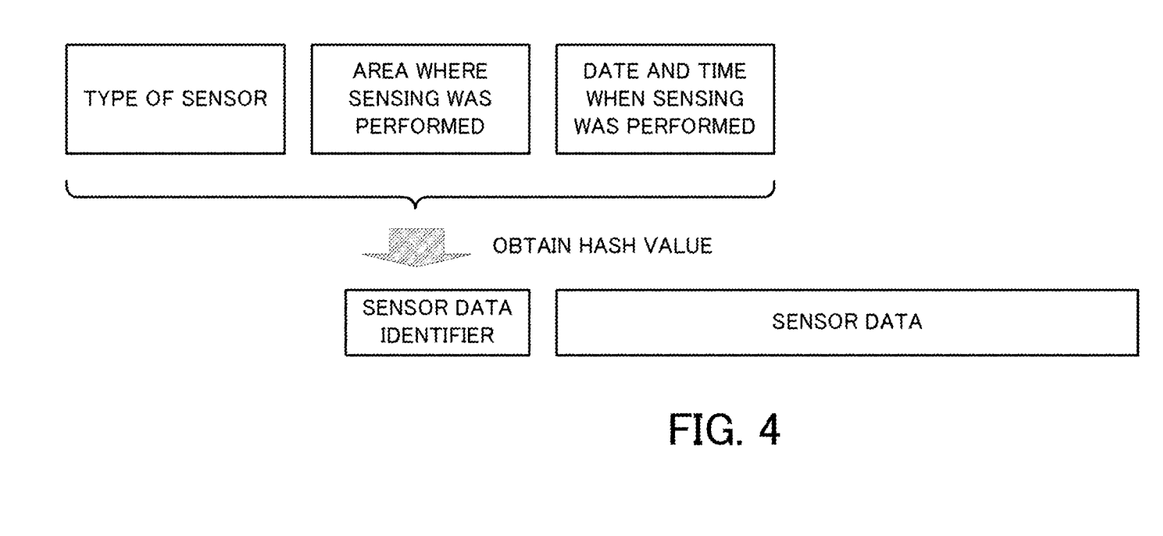
FIG. 4 is a schematic diagram of sensor data transmitted in the embodiment.

It is preferable that the sensor data is handled as a set together with an identifier for the master node 10 to manage the sensor data. For example, as illustrated in FIG. 4, the sensor data may be associated with an identifier indicating that it is a predetermined type of sensor data generated in a predetermined area at a predetermined date and time. In the present example, a hash value is obtained from the type of sensor, the area where sensing was performed, and the date and time when the sensing was performed, and the hash value is added as an identifier to the sensor data. This identifier is hereinafter referred to as sensor data identifier. In the following description, the identity of the sensor data is determined based on the sensor data identifier.

It is noted that the sensor data identifier may be generated based on factors other than those exemplified or may be generated by means other than a hash.

The storage unit 104 is means for temporarily or permanently storing data used by the device. It is preferable to use a large-capacity storage medium that can read and write at a high speed as the storage unit 104. For example, a flash memory or the like can be suitably used as the storage unit 104. The storage unit 104 stores the sensor data generated by the device itself, the sensor data received from another radio communication device 100, the data transmission request received from the master node 10, and the like.

The stored sensor data is deleted when the sensor data has been transmitted to the master node 10 or it is determined that it is not necessary to transmit the sensor data to the master node 10. It is noted that the deletion may be performed in accordance with a predetermined criterion when the usable storage capacity becomes less or when the stored data becomes old. Further, the stored data transmission request may also be deleted in accordance with a predetermined criterion.

The master node 10 is a device that collects the sensor data from the vehicle 20. The master node 10 is connected to a roadside device via a fixed network such as the Internet or a private network and collects the sensor data from the radio communication devices 100 mounted on the vehicles 20. The sensor data to be collected may be, for example, data related to traffic information and the like, data for contributing to traffic safety, or the like.

(Outline of Processing)

The outline of processing performed by the master node 10 and the radio communication device 100 in the present embodiment will be described. In the following description, it is assumed that each device performs radio communication by SRv6.

The master node 10 according to the present embodiment transmits information for requesting the sensor data (data transmission request) to the plurality of radio communication devices 100. In the present embodiment, the segment routing header included in the data transmission request includes the following three pieces of information.

(1) Identifier of the upper node
(2) Hop count from the master node 10
(3) Bloom filter generated from the information held by the master node 10

It is noted that the segment routing header may include other information for routing.

The upper node is another radio communication device 100 located closer to the master node 10 than the device itself. That is, the upper node is a partner to which the sensor data to be delivered to the master node 10 is to be handed over. The identifier of the upper node is updated from time to time in the course of routing.

The hop count is the number of hops from the master node 10. The hop count is also updated from time to time in the course of routing.

The above-mentioned (3) will be described.

The Bloom filter is a probabilistic data structure which is used for testing whether or not certain data A is a member of a set B. Use of the Bloom filter makes it possible to determine whether or not the data (the above-mentioned A) generated by the radio communication device 100 is included in the data (the above-mentioned B) held by the master node 10. That is, by referring to the Bloom filter included in the data transmission request transmitted from the master node 10, the radio communication device 100 can determine whether or not the data held by the device itself is data to be transmitted to the master node 10.

A method of implementing a bloom filter and a method of verifying the bloom filter will be briefly described. Here, it is assumed that the following two data, A and B are stored in the master node 10. The data exemplified here is, for example, a bit string representing a sensor data identifier.

Held data A: [00100100111010]
Held data B: [10110001010010]
Here, the bitwise OR operation of both is defined as the Bloom filter.
Bloom filter: [10110101111010]
In the case where such a filter is provided, the bitwise AND operation of test data and the filter makes it possible to determine whether the test data is not included in the held data.
Test data A: [00100100111010] (same as held data A)
Bloom filter: [10110101111010]
Bitwise AND operation of both: [00100100111010]
In the case of this example, the data string resulting from the bitwise AND operation of both is equal to the test data. This means that "it cannot be said that test data A is not included in the held data" (a false positive does not allow the assertion that the probability of presence is 100%).
Next, consider the following case.
Test data B: [01111100111010]
Bloom filter: [10110101111010]
Bitwise AND operation of both: [00110100111010]
Here, the data string resulting from the bitwise AND operation of both is different from the test data. This means that "test data B does is not included in the held data". Since a false negative cannot occur, the reliability of that determination is 100%.

In the present embodiment, the radio communication device 100 uses such a Bloom filter to determine that the sensor data held by the device itself is data not held by the master node 10, and then transmits the sensor data based on the determination result. This allows the radio communication device 100 to transmit only data not held by the master node 10.

It is noted that the Bloom filter does not cause erroneous detection due to false negatives. In other words, it results in no failure to acquire the sensor data (it is noted that false positives may occur, so that duplicate transmission of data may occur but it is a negligible probability).

It is noted that in the following description, a Bloom filter refers to the Bloom filter generated by the master node 10 (including that updated by the radio communication device 100 in the course of data transfer).

First, a data transmission request is transmitted from the master node 10 and then received by a nearby radio communication device 100. When newly discovering another radio communication device 100, the radio communication device 100 establishes a radio connection (link) with the other radio communication device 100 and transfers the data transmission request to the other radio communication device 100. Accordingly, the data transmission request is propagated to the plurality of radio communication devices 100.

Each of the radio communication devices 100 refers to the received data transmission request to determine whether or not the sensor data held by the device itself is data not held by the master node 10. Then, based on the determination result, the radio communication device 100 transmits the sensor data. When transmitting the sensor data, the plurality of radio communication devices 100 transfer the sensor data in a direction close to the master node 10 by segment routing. This allows the master node 10 to collect only the sensor data not held by the master node 10 from the radio communication devices 100.

(Details of Processing)
Next, the processing performed by the radio communication device 100 will be described in detail.

Figure 5:
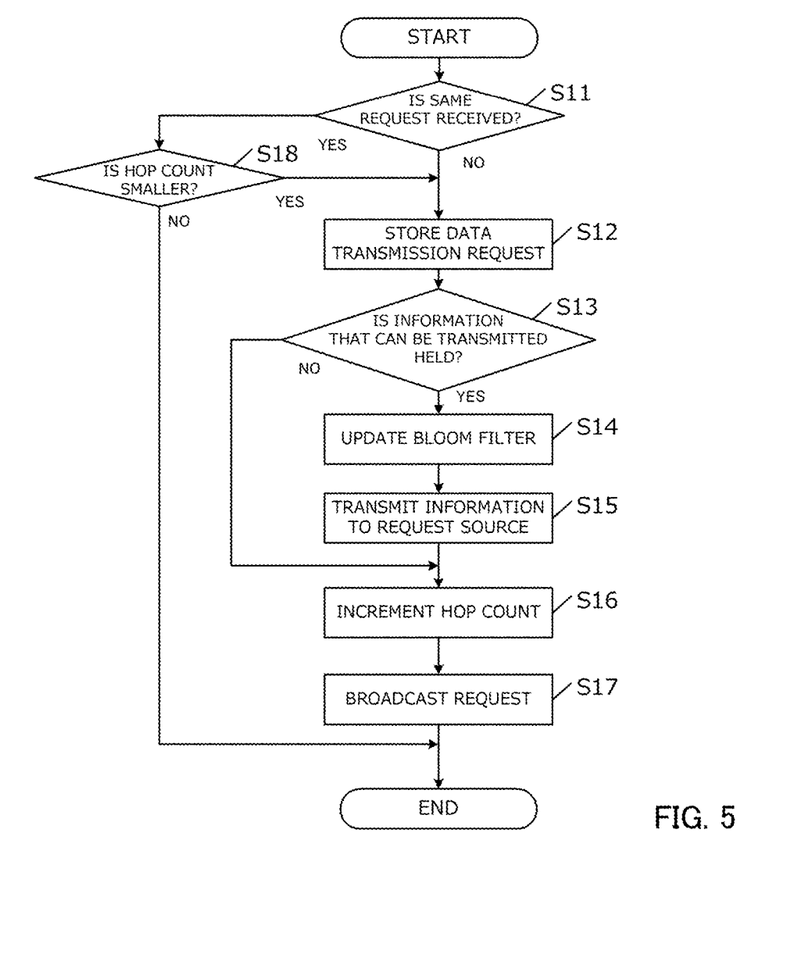
FIG. 5 is a flowchart of first processing performed by the radio communication device 100.

First, a method of transmitting a data transmission request by the radio communication device 100 will be described with reference to FIG. 5 which is a flowchart of processing performed by the radio communication device 100. The processing illustrated in FIG. 5 is started by the control unit 102 when the data transmission request transmitted by the master node 10 is received. The data transmission request to be transmitted is a packet including a Bloom filter as described above. The received data transmission request is stored in the storage unit 104 for a predetermined period from the reception.

First, in step S11, the storage unit 104 is referred to and it is determined whether or not the same data transmission request has already been received. The same data transmission request is a data transmission request transmitted from the same master node 10 and including the same Bloom filter.

If the same data transmission request has not been received, the received data transmission request is stored in the storage unit 104 in step S12.

Next, in step S13, the Bloom filter included in the received data transmission request and the sensor data generated and temporarily stored by the device itself are referred to, it is determined whether or not sensor data that can be transmitted to the master node 10 is held. In this step, it is determined whether or not sensor data not held by the master node 10 is included in stored pieces of sensor data by the above-described method; if included, it is determined that the sensor data can be transmitted. If there is no sensor data that can be transmitted, the processing proceeds to step S16 described later.

In step S14, the bloom filter included in the data transmission request is updated.

In the case where the data transmission request transmitted from the master node 10 is transferred to another radio communication device 100 as it is, and in the case where the other radio communication device 100 holds the same sensor data as the sensor data transmitted by the device itself, the data is transmitted in duplicate. Therefore, the radio communication device 100 updates the bloom filter when transmitting the sensor data to the master node 10.

Specifically, the result of the bitwise OR operation of the sensor data identifier of the sensor data to be transmitted and the Bloom filter currently held is defined as an updated bloom filter. Then, the data transmission request including the updated Bloom filter is transferred to the other radio communication device 100. As a result, the other radio communication device 100 positioned lower than the radio communication device 100 itself can recognize the sensor data already transmitted to the master node 10. The data transmission request stored in the storage unit 104 is similarly updated.

Next, in step S15, the sensor data determined in step S13 that it can be transmitted is transmitted to the master node 10.

In step S16, the hop count included in the data transmission request temporarily stored is incremented.

Then, in step S17, the data transmission request temporarily stored is broadcast to the other connected radio communication device 100.

If in step S11, the same data transmission request has already been received, then in step S18, it is determined whether or not the hop count included in the data transmission request is smaller than the hop count included in the data transmission request already received. Here, the hop count being smaller means that the data transmission request has arrived through a path shorter than in the case where a data transmission request was previously received. In this case, the processing proceeds to step S12 and is continued. If the hop count is equal or larger, the processing is terminated. As a result, a shorter route to the master node 10 can be established.

Figure 6:
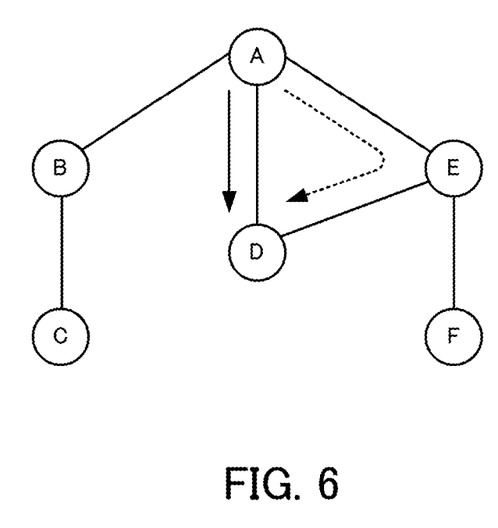
FIG. 6 is a diagram for describing a data transfer path.

For example, when the radio communication device 100 is in a connection relationship as illustrated in FIG. 6, the radio communication device 100 located at D can receive a data transmission request over a plurality of paths. However, the radio communication device 100 can process only the data transmission request arrived through the shortest path by referring to the hop count. For example, if a data transmission request has already been received through the path indicated by the solid arrow, the data transmission request transmitted through the path indicated by the dotted arrow is discarded. Further, if the data transmission request has already been received through the path indicated by the dotted arrow, the path to the master node 10 is updated to the path indicated by the solid arrow when the data transmission request through the path indicated by the solid arrow.

As described above, the processing when the radio communication device 100 receives the data transmission request transmitted from the master node 10 has been described.

Figure 7:
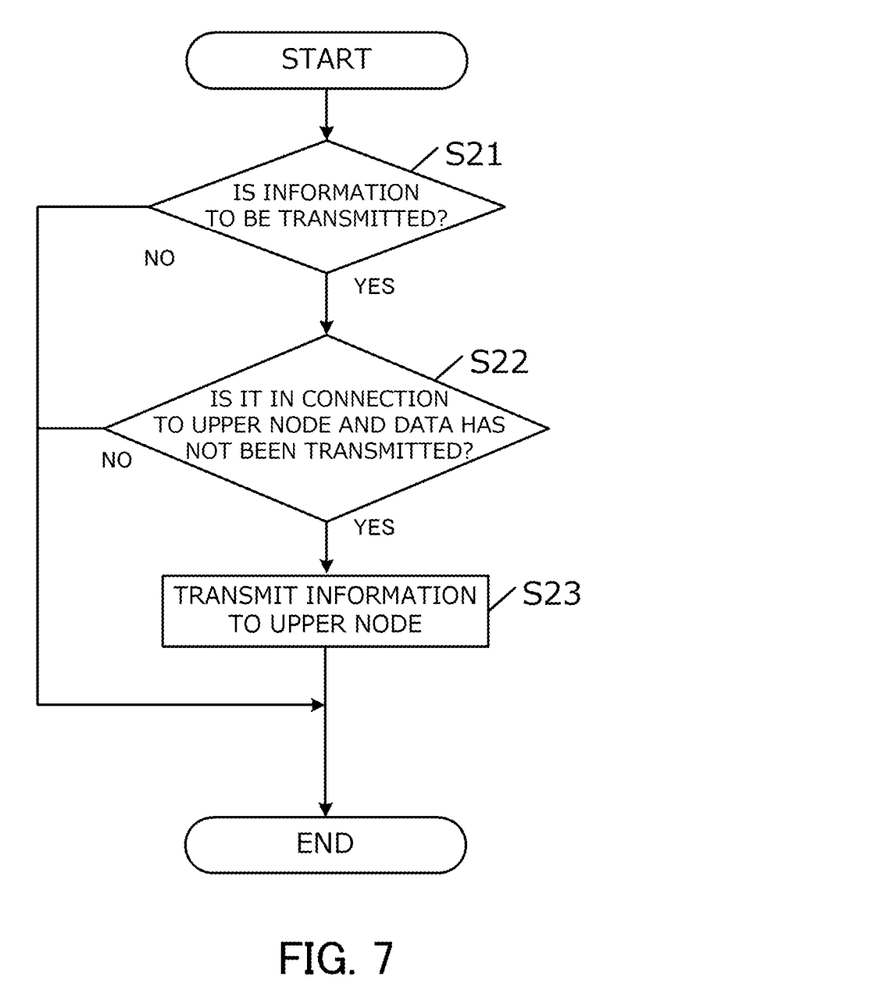
FIG. 7 is a flowchart of second processing performed by the radio communication device 100.

Next, processing in a case where the radio communication device 100 newly acquires sensor data will be described. The processing illustrated in FIG. 7 is started when the radio communication device 100 newly acquires sensor data. It is noted that "the case where the radio communication device 100 newly acquires the sensor data" includes a case where the radio communication device 100 receives the sensor data being currently transferred toward the master node 10, from another radio communication device 100.

First, in step S21, it is determined whether or not the acquired sensor data is information to be transmitted to the master node 10. Similarly to step S13, that determination can be made by the Bloom filter included in the data transmission request stored in the storage unit 104. It is noted that in a case where the acquired sensor data is generated by another radio communication device 100, step S21 may be omitted.

If it is determined that the sensor data is to be transmitted to the master node 10, then it is determined in step S22 whether the device itself is in connection to the upper node and the target sensor data has not been transmitted. Here, if the radio communication device itself is not connected to the upper node or if the target sensor data has already been transmitted, the processing is terminated.

If an affirmative determination is made in step S22, the sensor data is transmitted to the upper node in step S23.

Figure 8:
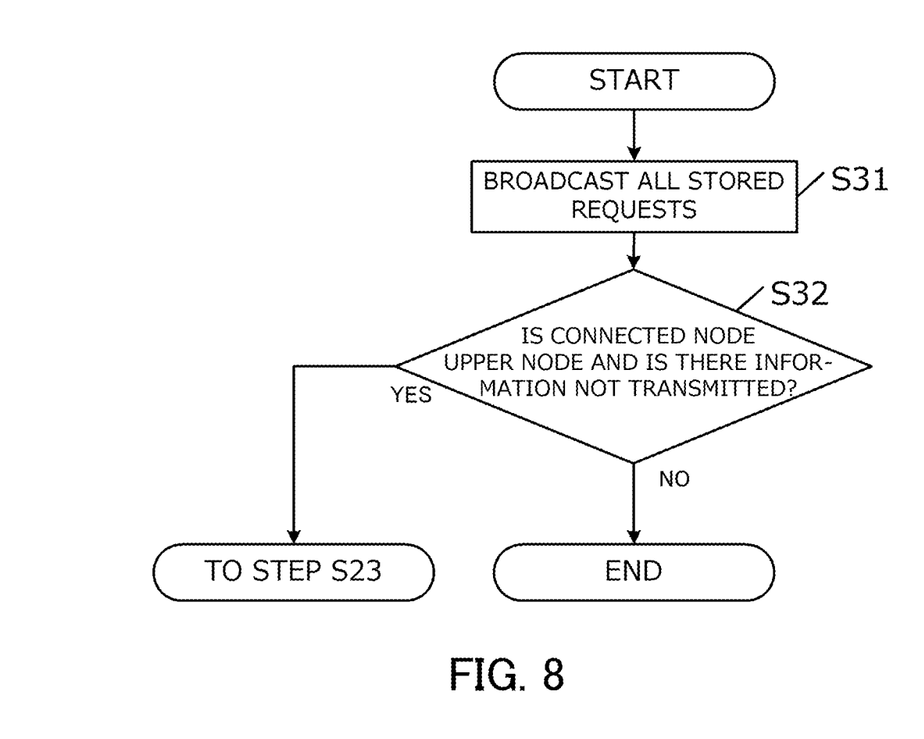
FIG. 8 is a flowchart of third processing performed by the radio communication device 100.

Next, processing when the radio communication device 100 is newly connected to another node will be described. The processing illustrated in FIG. 8 is started when the radio communication device 100 newly establishes communication with another radio communication device 100 or the master node 10.

First, in step S31, all the data transmission requests stored in the device itself are broadcast. If the connection destination is the master node 10, this step may be omitted.

Next, in step S32, it is determined whether the connected node is an upper node (that is, a node that exists closer to the master node 10 than the device itself) and sensor data not transmitted is stored in the storage unit 104. Here, if the connected radio communication device 100 is not an upper node or there is no sensor data yet to be transmitted, the processing is terminated.

If an affirmative determination is made in step S32, the processing proceeds to step S23, and transmission of sensor data to the upper node is performed.

As described above, according to the present embodiment, in the system in which a data transmission request is transmitted from the master node 10 to the plurality of radio communication devices 100 and the radio communication device 100 then transmits sensor data to the master node 10 in response to the data transmission request, it is possible to selectively transmit only the sensor data not held by the master node 10. In particular, by including a Bloom filter in the data transmission request, only information not held by the master node 10 can be transmitted to the plurality of radio communication devices 100 at a low cost.

In addition, since the Bloom filter is updated from time to time when the data transmission request is transmitted, unnecessary transmission of data can be prevented.

(Modification)

The above-described embodiment is merely an example, and modifications as appropriate can be implemented within the scope without departing from the spirit of the present invention.

For example, in the description of the embodiment, the Bloom filter is used to identify data not held by the master node, but such identification may be performed using another data structure.

Conversely, a data structure for identifying data held by the master node may be used. In any case, these pieces of information can be stored in the segment routing header.

In the description of the embodiment, all the pieces of sensor data not held by the master node 10 are to be transmitted, but the sensor data to be transmitted may be selected. For example, information for specifying the transfer destination of the data transmission request or the vehicle 20 that transmits the sensor data may be included in the data transmission request. This makes it possible to collect sensor data only from the vehicle 20 having a certain attribute. Such information can also be stored in the segment routing header.

Further, in the description of the embodiment, as illustrated in FIG. 1, the aspect in which the radio communication devices 100 mounted on the plurality of vehicles 20 relay the sensor data is illustrated. However, the sensor data may be directly transmitted to the master node 10 via, for example, a cellular network or the like.

What is claimed is:

1. A radio communication system in which a master node collects data acquired by a plurality of sensor nodes, wherein
the master node comprises an information requester configured to transmit, to the plurality of sensor nodes, a data transmission request including held data information that is information related to data already held by the master node, and
a sensor node comprises a transmitter configured to transmit, to the master node, data not held by the master node on the basis of the held data information, and a transferer configured to transfer the data transmission request to another sensor node,
wherein the data transmission request includes information representing a hop count from the master node, and the transferer transfers the data transmission request after incrementing the hop count, and
wherein the transferer does not transfer the data transmission request when the received data transmission request is the same as a previously received data transmission request and the hop count included in the data transmission request is greater than the hop count included in the previously received data transmission request.

2. The radio communication system according to claim 1, wherein when the transmitter has transmitted the data to the master node, the transferer reflects the transmitted data in the held data information and then transfers the resulting held data information.

3. The radio communication system according to claim 1, wherein the held data information indicates a Bloom filter for verifying that the target data is data not held by the master node.

4. The radio communication system according to claim 3, wherein the transferer adds, to the Bloom filter, an identifier of the data transmitted to the master node.

5. The radio communication system according to claim 1, wherein the master node and the sensor node each transfer the data by segment routing, and the held data information is transmitted while stored in a segment routing header.

6. A radio communication method performed by a radio communication system in which a master node collects data acquired by a plurality of sensor nodes, wherein the master node performs transmitting, to the plurality of sensor nodes, a data transmission request including held data information that is information related to data already held by the master node, and a sensor node, performs transmitting to the master node, data not held by the master node on the basis of the held data information, and comprises a transferer for transferring the data transmission request to another sensor node, wherein the data transmission request includes information representing a hop count from the master node, and the transferer transfers the data transmission request after incrementing the hop count, and wherein the transferer does not transfer the data transmission request when the received data transmission request is the same as a previously received data transmission request and the hop count included in the data transmission request is greater than the hop count included in the previously received data transmission request.

* * * * *